United States Patent [19]

Hachtel et al.

[11] 4,417,208
[45] Nov. 22, 1983

[54] APPARATUS FOR CONTACTLESS DISTANCE AND/OR SPEED MEASUREMENT

[75] Inventors: Hansjörg Hachtel, Weissach; Klaus Dobler, Gerlingen, both of Fed. Rep. of Germany

[73] Assignee: Robert Bosch GmbH, Stuttgart, Fed. Rep. of Germany

[21] Appl. No.: 214,743

[22] Filed: Dec. 9, 1980

[30] Foreign Application Priority Data

Apr. 12, 1980 [DE] Fed. Rep. of Germany ....... 3014137

[51] Int. Cl.³ ........................... G01P 3/46; G01P 3/52
[52] U.S. Cl. .................................................. 324/164
[58] Field of Search ............... 324/164, 163, 207, 208, 324/237, 240

[56] References Cited

U.S. PATENT DOCUMENTS 4,164,706  8/1979  Akita ................................. 324/208

FOREIGN PATENT DOCUMENTS 1163562 of 1964 Fed. Rep. of Germany .
1163563 of 1964 Fed. Rep. of Germany .
1192428 of 1965 Fed. Rep. of Germany .
2541538 of 1976 Fed. Rep. of Germany .

Primary Examiner—Stanley T. Krawczewicz
Assistant Examiner—Jose M. Solis
Attorney, Agent, or Firm—Frishauf, Holtz, Goodman & Woodward

[57] ABSTRACT

An apparatus for contactless distance, or travel and/or speed measurement of bodies moving substantially uniformly is disclosed. The apparatus has zones of electrically conductive material which are displaced in synchronism with the body and a measuring transducer disposed at a distance therefrom and spatially fixed, the measuring transducer having a high-frequency alternating current flowing through it. To permit construction of a measuring transducer having large geometric dimensions while detecting narrow electrically conductive zones (10) of attaining measurement signals which are relatively invulnerable to malfunction, the measuring transducer (15) is extended spatially over a multiplicity of zones (10) and has individual, active measuring faces (16) which are interconnected and spatially demarcated. The distance of these active measuring faces (16) from one another, viewed in the direction of movement of the zones (10), corresponds substantially to the distance (b) of adjacent zones (10) and the width of the measuring faces, also viewed in the direction of movement of the zones (10), corresponds substantially to the width (c) of the zones (10).

20 Claims, 13 Drawing Figures

APPARATUS FOR CONTACTLESS DISTANCE AND/OR SPEED MEASUREMENT

The invention relates to apparatus for contactless distance or travel and/or speed measurement of a body relative to a transducer, or pickup, in which the body moves, e.g. at a substantially uniform rate, e.g. in a rotary path.

BACKGROUND

Speed, and distance, particularly, revolution detection apparatus are increasingly required for the detection of rotary speed or positions, e.g. angular position of a rotating body, for open and closed-loop control of engines. Such apparatus may function according to the eddy-current measurement method, known per se, in which upon the approach of the electrically conductive zones to a measuring transducer having alternating current of high frequency flowing through it, eddy currents are generated. The eddy currents have the effect of energy extraction, that is, a reduction in amplitude of the electrical oscillation in the measuring transducer. This is made use of, after approximate processing, as a measuring signal for the speed, e.g. rotary speed, or for the position of the moving body.

In a known apparatus of this kind, which is applied in particular to rotating engines, gears which are already present in the engines (for instance the flywheel gear in the combustion engine) are utilized with a suitable measuring transducer for obtaining pulses. The tooth crests represent the zones of the electrically conductive material. Difficulties arise as a result of the substantial dependency of the measuring transducer signal upon the size of the measuring transducer and the distance of the measuring transducer from the moving body, in this case the rotating gear. In order to attain high resolutions for an exact measurement of the position or speed, large numbers of teeth must be detected with small dimensions on the part of the measuring transducer. The measuring transducer must have geometric dimensions, such as its diameter, which correspond approximately to the dimensions of the teeth, so as to be able to reliably detect individual teeth. However, three limitations are placed on the reduction of the dimensions of the measuring transducer: First, the manufacture of minimum-size measuring transducers is expensive; second, the measuring distance between the measuring transducer and the electrically conductive zones must necessarily be reduced; and, finally, there is an increasing reduction of the measuring signal obtained as the measuring transducers become smaller. This means that in many cases it is no longer possible at all to manufacture measuring transducers capable of detecting the finest gear teeth pitch, having tooth widths of less than 1 mm.

Even where only coarse pitch gears are used, such as the flywheel gears in combustion engines, detection, problems arise. Because of the high tolerances in the radial direction and as a result of severe mechanical oscillations on the part of the rotating flywheel during operation, the measuring transducer must be at a relatively long measuring distance from the electrically conductive zones, in this case the teeth to be detected. The consequence is that the measuring transducer, if it is still to be capable of emitting a sufficiently large measuring signal, must have a relatively large diameter; as a result, it will generally already detect several teeth at once, and clean resolution of the individual tooth becomes difficult.

THE INVENTION

It is an object to improve the signal output from a transducer which is capable of responding to fine-tooth subdivisions, or to detect very narrow electrically conductive zones on a body moving relatively thereto.

Briefly, one of the bodies, for example a gear, is formed with zones of electrically conductive material, displaced from each other, and moving in synchronism therewith. They are spaced from each other—in the direction of movement—by uniform distances, for example by the distances of tooth gaps between adjacent teeth of a gear. The end faces of the zones, for example the end faces of the teeth, form the conductive zones. A measuring transducer which, for example, may be fixed, and spaced from the moving teeth, has a coil thereon, through which alternating current flows, preferably of high frequency, and so positioned that individual interconnected active measuring faces will be formed on the fixed transducer, on which coil conductors are located, the measuring faces having a width which, essentially, corresponds to the zones, for example the projecting end faces of the gear teeth, of the moving body. The individual conductors of the coil, and located opposite said zones, are interconnected, preferably serially connected, so that, upon passage of the teeth, or conductive zones, eddy-current losses will change the current flow through the conductor. Since a plurality of zones will be opposite a plurality of conductor sections, which are serially connected, a substantial undulating signal will be obtained as an output, the signal level of which is essentially independent of the relative speed of the transducer and the body which has the zones thereon, for example a gear.

ADVANTAGES OF THE INVENTION

The apparatus according to the invention for contactless travel or distance and/or speed measurement has the advantage that the measuring transducer may have relatively large geometric dimensions and yet is still in a position to detect the finest tooth subdivision or pitch or to detect very narrow electrically conductive zones on the moving body. The zones themselves may be smaller than 1 mm. Nevertheless, a measuring signal of sufficient level is available for use at the output of the measuring transducer. As a result of the relatively large geometric dimensions of the measuring transducer, the measuring distance between it and the moving body with its electrically conductive zones can also be made large enough without impairing the resolution capacity of the measuring transducer. The apparatus according to the invention may thus be applied without difficulties in the case of rotating bodies having large radial tolerances as well. The measuring signal which is available for use at the output of the measuring transducer is a sinusoidal voltage, at each velocity of the moving body. This voltage lends itself well to use for the purpose of rotary speed measurement, linear speed measurement, position indication, or the triggering of operating procedures. The simultaneous scanning of a multiplicity of teeth results in elevated measuring signals which are relatively invulnerable to malfunction. The apparatus according to the invention exhibits a similarly high resolution capacity even in the detection of the finest tooth subdivision or the narrowest electrically conductive zones, which previously was attainable only by means of optoelectronic measuring methods. In contrast to these apparatus, which operate on the optoelectronic principle, the apparatus according to the invention is not vulnerable to soiling.

The form of embodiment of the invention is particularly advantageous in which the coil is a flat coil which is partially masked and exposed only at the zones. By means of this masking of the coil surface, the measuring transducer according to the invention can be produced relatively simply and with low manufacturing cost.

The zones of the electrically conductive material simply may be the crests of gear teeth, or tooth crests of a row of teeth extending in the direction of movement of the body and are disposed in one piece with this tooth row. In apparatus in which for structural reasons it is necessary to have a flat surface of the body carrying the electrically conductive zones—or of some other carrier rigidly connected therewith—an embodiment of the invention in which, alternately, ferromagnetic and non-magnetic elements are located, e.g. on a strip, is particularly useful. Since non-ferromagnetic materials have a different sensitivity from ferromagnetic material, the apparatus according to the invention which is thus equipped has the same advantageous properties as are described above.

DRAWING

Shown in schematic form are:

FIG. 1, a longitudinal section through an apparatus for contact-free travel and/or speed measurement according to a first exemplary embodiment;

FIG. 2, a section taken along the line II—II of FIG. 1;

FIG. 3, a longitudinal section through an apparatus according to a second exemplary embodiment;

FIG. 4, a longitudinal section through an apparatus in accordance with a third exemplary embodiment;

FIG. 5, a section taken along the line V—V of FIG. 4;

FIG. 6, the same section as in FIG. 5 taken through an apparatus in accordance with a fourth exemplary embodiment;

FIG. 7, a longitudinal section through an apparatus according to a fifth exemplary embodiment;

FIG. 8, a section taken along the line VIII—VIII of FIG. 7;

FIG. 9, a longitudinal section through an apparatus in accordance with a sixth exemplary embodiment;

FIG. 10, a section taken along the line X—X in FIG. 9;

FIG. 11, a perspective view of an apparatus in accordance with a seventh exemplary embodiment;

FIG. 12, a longitudinal section taken through an apparatus in accordance with an eighth exemplary embodiment; and FIG. 13, a longitudinal section taken through an apparatus in accordance with a ninth exemplary embodiment.

DESCRIPTION OF THE EXEMPLARY EMBODIMENTS

Figure 1:
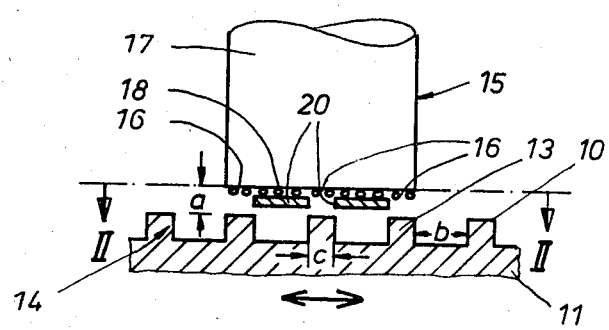
Figure 2:
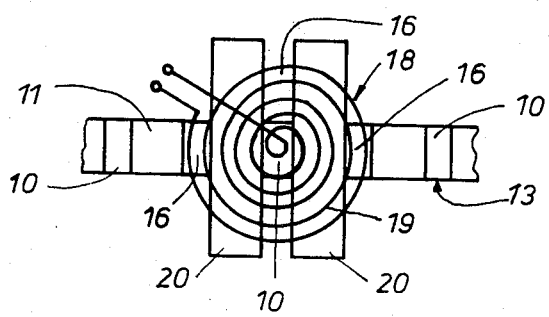
Figure 3:
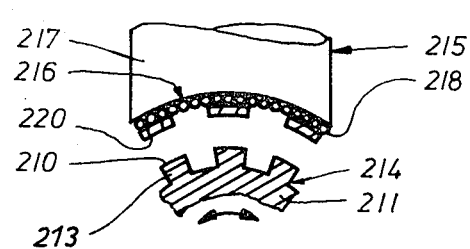

The apparatus shown in FIGS. 1 and 2 for contactless travel and/or speed measurement of a body moving substantially uniformly has zones 10 of electrically conductive material, which are either disposed—as in this case—on the surface of the moving body 11 itself or on a separate carrier 812 (FIG. 12) rigidly connected with the moving body 11. The zones 10 are thus displaced in synchronism with the moving body and are disposed in the direction of movement, at a uniform distance apart from one another. In the apparatus according to FIG. 1, the body 11 moves in its longitudinal direction; in other words, it executes a longitudinal movement. However, the body 11 may equally well rotate, as shown in FIG. 3 (sheet 3). The zones 10 are disposed on tooth crests 13 of a row of teeth 14 extending in the direction of movement. If the body 11 is of electrically conductive material, such as iron, then these zones 10 do not need to be provided separately; instead, they are produced automatically on the surface of the tooth crests.

The apparatus for contactless travel and/or speed measurement furthermore has a measuring transducer 15, which is disposed at a distance a from moving zones 10 or from the tooth crests 13, this being the measuring distance a. The measuring transducer 15 has a high-frequency alternating current flowing through it. The measuring transducer 15 extends spatially over a multiplicity of zones 10 and has individual, active measuring faces 16 which are interconnected but spatially demarcated. The distance from one another of these measuring faces 16 in the direction of movement of the zones 10 or the tooth row 14 or the body 11, corresponds substantially to the distance b of sequential zones 10, and their width, viewed in the direction of movement of the zones 10, corresponds substantially to the zone width c. The measuring faces 16 function as though electrically switched individually in series, so that a multiplicity of zones 10 is simultaneously scanned by the measuring transducer 15.

The measuring transducer 15 in FIGS. 1 and 2 has a holder 17 and a spiral flat coil 18 on the end side of the holder 17 opposite the zones 10. The flat coil 18, which is wound in a single layer or in a multiple layer, has its closed coil surface 19 covering a multiplicity of zones 10; in this case, three zones 10 in all are covered by the coil surface 19, at a distance which corresponds approximately to the measuring distance a. Two crosspieces 20 of the electrically conductive material are disposed between the coil surface 19 and the zones 10 or the surface of the tooth crests 13. These crosspieces 20 are disposed fixedly, at a distance from one another, in the direction of movement of the zones 10. The coil surface sections which remain free between the crosspieces 20 are the active measuring faces 16. The length of the crosspieces 20 measured transverse to the direction of movement of the zones 10 or of the body 11 corresponds at least to the extent, measured in this direction, of the zones 10 and/or of the coil surface 19.

Operation

The crosspieces 20 effect a quasi-mask-like shielding of the coil 18; as a result, a measuring face 16 is created only in the region of the gap between the crosspieces 20, and high-frequency oscillations penetrate the zones 10 from this measuring face 16. If an electrically conductive zone 10 now approaches one of the measuring faces 16, then eddy currents are generated in the zone 10. The effect of these eddy currents is an energy extraction, that is, an amplitude reduction of the electrical oscillation in the flat coil 18. Because three measuring faces 16, switched electrically in series, are present in all, eddy currents of this kind are simultaneously generated in three teeth, and a correspondingly great reduction in amplitude of the electrical oscillation occurs. A measuring signal is thus available for use at the output of an evaluation circuit, not shown here, connected with the flat coil 18, this measuring signal being a sinusoidal voltage when there is a relative movement between the zones 10 and the measuring transducer 15 or the flat coil 18. The level of this sinusoidal voltage is independent of the relative speed. This voltage signal may then be processed for the purpose of speed or travel measurement or also for indication of the position of the body 11.

The exemplary embodiment shown in FIG. 3 of an apparatus for contact-free travel and/or speed measurement differs from the apparatus described above only in that the body 211 having the tooth row 214 does not execute a longitudinal movement, but rather a rotational movement. For this reason, identical components have identical reference numerals but increased by the number 200. Here, as well, the surface of the measuring transducer 215 or the flat coil 218 extends parallel to the surface of the moving body 211. The surface of the measuring transducer 215 in this case is thus formed to be concave.

Figure 4:
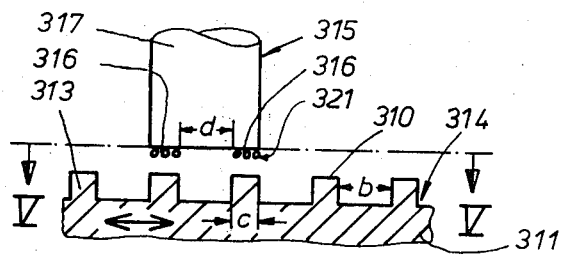
Figure 5:
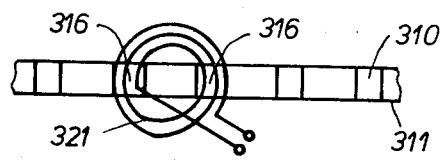

Embodiment of the apparatus shown in FIGS. 4 and 5; the body 311 moving in the longitudinal direction is embodied identically to the body 11 of FIGS. 1 and 2. Identical components are therefore provided with identical reference numerals but increased by the number 300. Besides the holder 317, the measuring transducer 315 has a single-layer, spiral frame coil 321. The frame coil 321, in turn, is disposed on the end side of the holder 317, opposite the zones 310. The frame coil 321 extends over two zones 310, and its inside diameter d, measured in the direction of movement of the zones 310 or of the body 311, corresponds to the zone distance b. The active measuring faces 316 are here embodied by the frame areas of the frame coil 321 which extend transversely to the direction of movement of the zones 310. The mode of operation of this apparatus is the same as that described above in connection with FIGS. 1 and 2.

Figure 6:
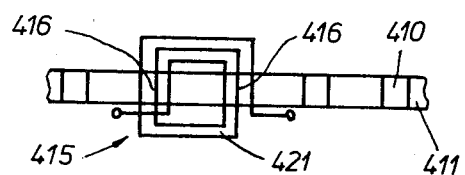

Embodiment of FIG. 6: it differs from the apparatus of FIGS. 4 and 5 solely in that the frame coil 421 is not circular but rectangular. Here, as well, the active measuring faces 416 of the measuring transducer 415 are embodied by frame arms of the frame coil 421 which extend approximately transversely to the direction of movement of the zones 410. Again, identical components have identical reference numerals but increased by 400.

Both in the exemplary embodiment of the apparatus according to FIGS. 4 and 5 and in the exemplary embodiment according to FIG. 6, the length of the zones 310 or 410, measured transversely to the direction of movement, is smaller than the dimension of the frame coil 321 or 421 which extends in this direction.

Figure 7:
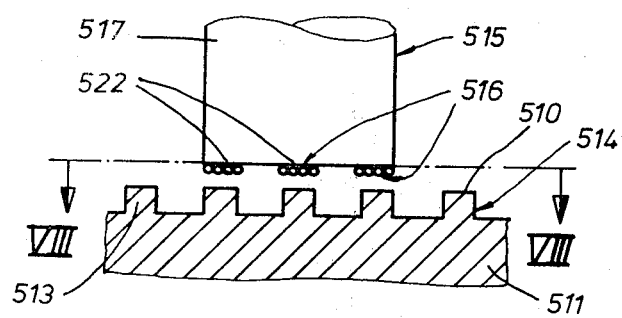
Figure 8:
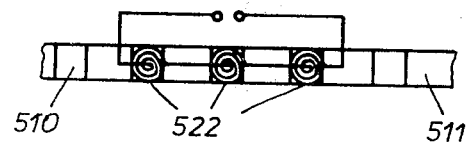

Embodiment of FIGS. 7 and 8: the measuring faces 516 are formed by interconnected individual flat coils 522, which are connected in series (FIG. 8). The individual flat coils 522 substantially correspond in their dimensions to the dimensions of the zones 510. Identical components are again provided with identical reference numerals, but increased by the number 500. The mode of operation of this exemplary embodiment is identical to that described above.

Figure 9:
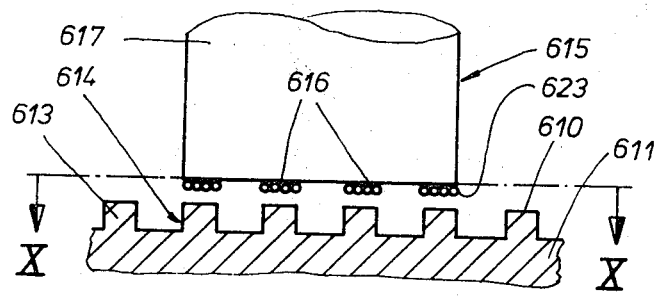
Figure 10:
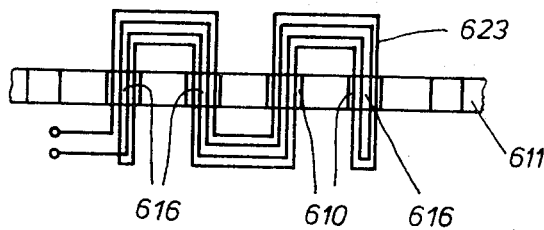

Embodiment of FIGS. 9 and 10: the measuring transducer 615 has a meandering flat coil 622 extending in the direction of movement of the zones 610 or of the body 611. The flat coil 623 is substantially bent at right angles in its meandering course. It is likewise disposed on the end side of the holder 617 opposite the zones 610.

The measuring faces 616 of the measuring transducer 615 and here formed by the partial coil surfaces extending transversely to the direction of extension of the flat coil 623. Otherwise, the structure and mode of operation of this apparatus agree with those described above, so that identical components are provided with identical reference numerals but increased by the number 600.

Figure 11:
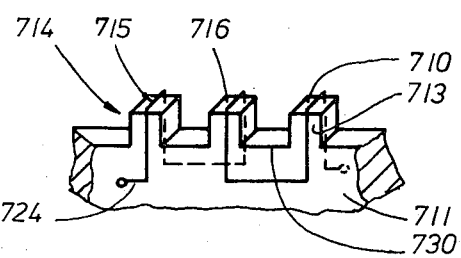

FIG. 11: it differs from the exemplary embodiment according to FIGS. 9 and 10 solely in that the coil sections, extending transversely to the direction of movement of the zones 610, of the single-layer flat coil 724 which is likewise meandering in form and protrude beyond the zones 710,/are bent, so that they extend at either side of the tooth crest 713 to below the tooth base 730. A portion of the tooth row 714, in this case, three teeth, is as it were entirely surrounded by the flat coil 724. Otherwise, the structure and mode of operation are as described above, so that identical components carry the identical reference numerals but increased by the number 700. In the present exemplary embodiment, the flat coil 724 is made up of a single wire. However, in order to generate a larger measuring signal, a multiplicity of wire layers should advantageously be disposed beside one another, so that a bent, meandering flat coil 724 is produced which is comparable to that of FIG. 10.

Figure 12:
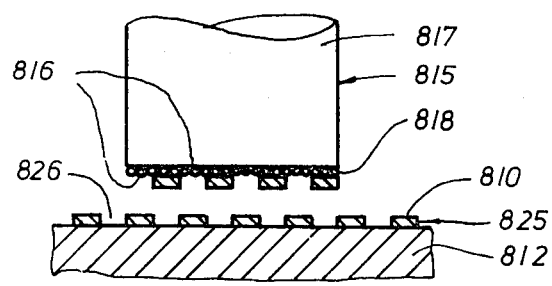

Embodiment of FIG. 12: the measuring transducer 815 corresponds identically to the measuring transducer 15 described in connection with FIG. 1. Differing from the apparatus shown in FIGS. 1 and 2, the zones 810 are here embodied by a bar pattern 825 which is applied to the surface 826 of a carrier 812, by means of vapor coating, printing, etching or the like, by way of example. The carrier 812 may be a disc, a band or the like and is rigidly connected with the moving body whose speed, travel or position is to be measured. Otherwise, the further structure and the mode of operation as well of this exemplary embodiment correspond to the previous exemplary embodiments, so that again identical components are provided with identical reference numerals but increased by the number 800.

Figure 13:
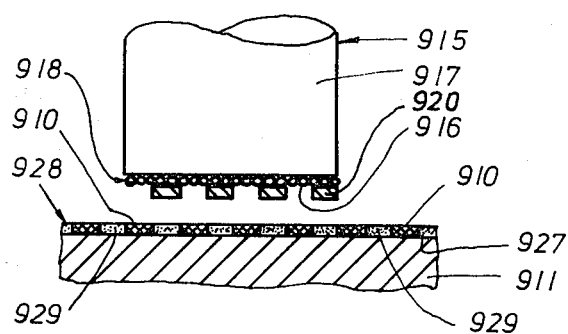

Embodiment FIG. 13: the measuring transducer 915 corresponds identically in structure with the measuring transducer described in connection with FIGS. 1 and 2. The surface 927 of the moving body 911—or of a suitable carrier rigidly connected therewith—has a structure of alternating fields of ferromagnetic and non-ferromagnetic material. The ferromagnetic fields form the zones 910, while the non-ferromagnetic fields form the interzonal areas 929. Naturally it is also possible for the zones 910 to made of non-ferromagnetic material and the interzonal areas 929 to made of ferromagnetic material. Since in the eddy-current measuring method, ferromagnetic material has a different sensitivity from non-ferromagnetic material, scanning of this structure 928 can be made in an identical manner by means of the measuring transducer 915. Depending upon whether the zones 910 or the interzonal areas 929 are disposed opposite the measuring faces 916, the energy extraction in the flat coil 918 is different and the amplitude change in the flat coil 918 is noticeably different. Otherwise, the structure and mode of operation of the apparatus of FIG. 13 agree with those of the other exemplary embodiments, so that identical components are again provided with identical reference numerals, increased by the number 900. This exemplary embodiment may be usefully applied whenever it is necessary for structural reasons to provide a body 911—or a suitable carrier rigidly connected therewith—with a flat surface.

Naturally it is possible in all the exemplary embodiments to connect the measuring transducer rigidly with the moving body whose speed, travel or position is intended to be measured and to dispose the zones of electrically conductive material at a fixed location.

It should further be noted with respect to the exemplary embodiment of FIG. 3 that in the case of a rotating body 211 having a relatively large diameter, the surface of the measuring transducer 215, and thus the flat coil 218, do not need to be formed as a curved surface; they may also be made flat, as in FIG. 1. Despite the non-parallel course of the surface of the body 211 or of the electrically conductive zones 210 relative to the measuring faces 216 which then exist, the measurement is still effected sufficiently precisely.

We claim:

1. An apparatus for contactless distance, or travel and/or speed measurement of bodies (11, 15) moving substantially uniformly, having zones (10-910) of electrically conductive material which are displaced in synchronism with the moving body and are disposed at a uniform distance (b) from one another in the direction of movement, and having a spatially fixed measuring transducer (15-915) disposed at a distance therefrom, which has coil means (18-918) located thereon facing said zones, and having alternating current flowing therethrough, characterized in that the measuring transducer (15-915) extends spatially over a multiplicity of zones (10-910) and has individual, interconnected, active measuring faces (16-916) which are spatially demarcated;

in that the distance between said measuring faces (16-916) viewed in the direction of movement of the zones (10-910) corresponds substantially to the distance (b) between adjacent zones and the width of said measuring face (16-916), viewed in the direction of movement of the zones (10-910), corresponds substantially to the width (c) of the zones (10-910);

and in that the coil means comprises at least one conductor (18-918) positioned on the zones and the conductors on the respective zones are connected together to form a single circuit.

2. An apparatus as defined by claim 1, characterized in that the conductors (18-918) on the measuring faces (16-916) form an electrically serially connected circuit.

3. An apparatus as defined by claim 1 or 2, characterized in that the conductor on the measuring transducer (15) comprises a flat coil (18) having a closed coil surface (19) overlapping at a distance a multiplicity of zones, that crosspieces (20) of electrically conductive material are disposed between the coil surface (19) and the zones (10), the crosspieces (20) being fixedly disposed at a distance from one another in the direction of movement of the zones (10), and that the coil surface sections which remain free between the crosspieces (20) form the active measuring faces (16).

4. An apparatus as defined by claim 3, characterized in that the length of the crosspieces (20), measured transversely to the direction of movement of the zones (10), corresponds at least to the length of the zones (10) and/or of the coil surface (19) measured in said direction.

5. An apparatus as defined by claim 1 or 2, characterized in that the measuring transducer (315; 415) has a flat frame coil (321; 421) which extends over two zones (310; 410) and whose inside diameter, measured in the direction of movement of the zones (310; 410) corresponds to the zone distance (c), and that the active measuring faces (316; 416) are formed by the frame areas or frame arms of the frame coil (321; 421) extending approximately transversely to the direction of movement of the zones (310; 410).

6. An apparatus as defined by claim 4, characterized in that the frame coil (321; 421) has an approximately circular or rectangular form.

7. An apparatus as defined by claim 5, characterized in that the length of the zones (310; 410), measured transversely to their direction of movement, is smaller than the length of the frame coil (321; 421) extending in this direction.

8. An apparatus as defined by claim 1 or 2, characterized in that conductor on the the measuring faces (516) comprises interconnected individual flat coils (522), whose dimensions (c) substantially correspond to the dimensions of the zones (510).

9. An apparatus as defined by claim 1 or 2, characterized in that the conductor on the measuring transducer (615) comprises a flat coil (623) extending in meandering form in the direction of movement of the zones (610) and including partial coil surfaces, extending transversely to the direction of extension, positioned on the meandering faces (616).

10. An apparatus as defined by claim 1 or 2 characterized in that the flat coils (18; 218; 321; 421; 623; 724) are single-layered or multi-layered.

11. An apparatus as defined by claim 1 or 2 characterized in that the zones (10-910) are disposed on the moving body (11-911) itself or on a carrier (812) rigidly connected with this body.

12. An apparatus as defined by claim 11, characterized in that the zones (810) are embodied by a bar pattern (825), which is attached to the surface (826) of the body or of the carrier (812), by means of vapor coating, printing, etching or the like, 13. An apparatus as defined by claim 11, characterized in that the zones (910) include ferromagnetic material and the interzonal areas (929) include non-ferromagnetic material, or vice versa.

14. An apparatus as defined by claim 11, characterized in that the zones (10-710) are disposed on tooth crests (13-713) of a tooth row (14-714) extending in the direction of movement.

15. An apparatus as defined by claim 11, characterized in that the zones (10-710) are disposed on tooth crests (13-713) of a row of teeth (14-714) extending in the direction of movement, and being unitary with said teeth.

16. An apparatus as defined by claim 11, characterized in that the surface of the measuring transducer (15-915) extends parallel to the surface of the moving body (11-911) or of the carrier (812) connected therewith.

17. An apparatus as defined by claim 6, characterized in that the length of the zones (310; 410), measured transversely to their direction of movement, is smaller than the length of the frame coil (321; 421) extending in this direction.

18. An apparatus as defined by claim 15, characterized in that the conductor on the measuring transducer (615) comprises a flat coil (623) extending in meandering form in the direction of movement of the zones (610) and including partial coil surfaces, extending transversely to the direction of extension, positioned on the measuring faces (616); and the partial coil surfaces of the meandering coil (724) which protrude beyond the zones (910) transversely to the direction of movement thereof are bend and extend at either side of the tooth crest (713) preferably to below the tooth base (730).

19. An apparatus as defined by claim 1, wherein the alternating current applied to the coil means is a high-frequency alternating current.

20. An apparatus as defined in claim 2, wherein the alternating current applied to the coil means is a high-frequency alternating current.

* * * * *